United States Patent [19]

Peil et al.

[11] 4,307,334
[45] Dec. 22, 1981

[54] TRANSFORMER FOR USE IN A STATIC INVERTER

[75] Inventors: William Peil, North Syracuse; Robert J. McFadyen, Syracuse, both of N.Y.

[73] Assignee: General Electric Company, Syracuse, N.Y.

[21] Appl. No.: 139,946

[22] Filed: Apr. 14, 1980

Related U.S. Application Data

[63] Continuation-in-part of Ser. No. 969,381, Dec. 14, 1978, abandoned.

[51] Int. Cl.³ .................. G05F 3/08; H01F 15/14; H01F 29/00; H02M 3/155
[52] U.S. Cl. .................. 323/351; 315/219; 336/172; 336/226; 363/133
[58] Field of Search .................. 363/18–22, 363/24, 56, 97, 131–134; 323/285–287, 290, 351, 250, 331; 336/172, 226; 315/219

[56] References Cited

U.S. PATENT DOCUMENTS

| 3,611,330 | 10/1971 | Cacossa | 363/134 |
|---|---|---|---|
| 3,914,680 | 10/1975 | Hesler et al. | 363/97 |
| 4,002,999 | 1/1977 | Hesler et al. | 331/113 A |
| 4,042,872 | 8/1977 | McLeod | 363/56 |
| 4,177,509 | 12/1979 | Bullinga | 363/133 |
| 4,202,031 | 5/1980 | Hesler et al. | 336/172 |
| 4,259,716 | 3/1981 | Harris et al. | 363/97 |

*Primary Examiner*—William H. Beha, Jr.
*Attorney, Agent, or Firm*—Richard V. Lang; Carl W. Baker; Philip L. Schlamp

[57] ABSTRACT

A novel and economical transformer is described for use in a static inverter in association with one or two switching devices, typically transistors. The transformer produces an output for control of the associated switching device(s) which changes in sense as a function of the flux level in the transformer core. The arrangement is applicable to a figure "8" flux configuration such as is achieved from two "E" cores, and requires only a single aperture located at the base of the common branch. Control is effected by a single primary and single secondary winding wound through the aperture. With two switching devices, two apertures are normally provided. The core which supports a figure "8" flux configuration may take other more economical alternatives such as "I" core, "T" core or a single "E" core.

20 Claims, 9 Drawing Figures

TRANSFORMER FOR USE IN A STATIC INVERTER

This is a continuation-in-part of co-pending U.S. Pat. application Ser. No. 969,381 entitled "A Transformer for Use in a Static Inverter" by William Peil and Robert J. McFadyen, now abandoned.

BACKGROUND OF THE INVENTION

1. Field of the Invention:

This invention relates to transformers for use in static inverters. Static inverters are devices in which electrical energy is converted to electrical energy in another form through static or non-moving parts. In static inverters to which the present transformer has application, a dc source produces a current through one, two or four semiconductor devices, each connected in series with a transformer winding, the arrangement producing a transformed output as the semiconductor devices are switched on and off. The transformers typically include control windings for efficient and stress-free switching of the associated semiconductor devices.

2. Description of the Prior Art:

Transformers for the static inverter application have been described in the U.S. Pat. Nos. 3,914,680; 4,002,999 of Hesler et al, and in the more recently filed application Ser. No. 875,337 of Peil et al, now abandoned and refiled as Ser. No. 28,405, now U.S. Pat. No. 4,259,716, all of which are assigned to the Assignee of the present application. In these citations, a transformer is described with properties which have been tailored to operating a transistor at a switching rate above audible frequencies (>15 KHz). A property of each of these transformers is to maximize the switching efficiency of the transistor and to avoid unduly stressing it. Stressing typically occurs from a decrease in impedance as seen by the transistor which results when the core becomes fully saturated. In each of the cited cases, a means is provided for determining when a specified level of flux density has occurred and then turning off the transistor before full core saturation and the detrimental stresses can occur. In the devices disclosed, positive, conduction inducing feedback is provided before attaining a specified level of flux density, and then negative, conduction inhibiting feedback is provided after this level of flux density is attained. In all of the arrangements, an aperture is provided through which control windings are threaded and these are typically connected between base and emitter electrodes of the associated transistors. The position of the aperture in the core defines in part the specified level of flux density at which the base drive will reverse.

While the foregoing arrangements share the preceding properties, there are significant differences. The devices described in U.S. Pat. No. 4,002,999 contain a single loop core (e.g. that made from two "C" cores) in which a single aperture is provided through which a figure "8" secondary control winding is threaded. A control winding serially connected with the main winding is also provided for predisposing the core on one side of the aperture to saturate first. When the pre-disposed side of the core saturates, the feedback induced in the figure "8" winding changes from conduction inducing to conduction inhibiting. The device acts as a current transformer prior to partial saturation and as a voltage transformer subsequent to partial saturation. The two modes are mutually exclusive and the transition is immediate.

Another transformer is described in U.S. application Ser. No. 28,405, filed Apr. 9, 1979, now U.S. Pat. No. 4,259,716, a continuation in part of application Ser. No. 875,337 filed Feb. 6, 1979, now abandoned. In that application, a single path core, typically made from the "C" cores (but also using shunted cores) is employed. Instead of a single aperture, two apertures are provided aligned along the direction of the main flux. A secondary control winding wound through the apertures is uncoupled to the main flux and is in a "neutral" region. A control winding energized simultaneously with the main winding is wound through the two apertures so as to provide a flux circulating about both apertures in respectively clockwise and counterclockwise modes. The circulating flux adds and subtracts from the main flux in five regions defined around the apertures. In the absence of saturation, the main flux is not coupled to the secondary control winding and the secondary control winding responds only to current passing through the primary control winding. However, as one or more regions saturate, the main flux is eventually steered through the neutral fifth region where it couples to the secondary control winding and reverses the sense of the feedback. The two aperture structures permits one to program the turn-off sequence by introducing intermediate stages in which the conduction inducing feedback is reduced and/or terminated prior to the application of conduction inhibiting feedback. The two-aperture configuration is a current transformer prior to partial saturation and a current transformer of reverse sense subsequent to saturation. With a transistor load, an alternative mechanism of drive reversal may occur, in which current transformer action continues before and after partial saturation.

A disadvantage of the two aperture configuration is the cost of making a second aperture, and the cost dictated requirement that the two apertures lie in a segment of the core structure in which all of the flux flows. With single loop cores or with a shunted core, the main windings and control windings can be placed on separate legs without mutual interference. With figure "8" cores, however, the main flux pursues two loops which consolidate in the central leg. The two aperture arrangement needs to be located on the central leg where all available space is most efficiently allocated to the main windings. Since figure "8" cores have a more efficient core utilization factor, it has been the object of the present invention to devise a transformer having the basic properties of the two aperture device, but one which would provide a minimum of interference between the control and the main power windings.

SUMMARY OF THE INVENTION

Accordingly, it is the object of the present invention to provide an improved transformer for use in a static inverter.

It is still another object of the present invention to provide an improved transformer designed to provide successively a conduction aiding and a conduction inhibiting control signal to an associated switching transistor, the transition occurring when the transformer reaches a predetermined level of flux density.

It is a further object of the present invention to provide an improved transformer which provides feedback whose sense is a function of a predetermined level of flux density.

It is still another object of the present invention to provide an improved transformer which provides feedback whose sense is a function of a predetermined level of flux density, the improvement having specific application to a figure "8" core configuration.

These and other objects of the invention are achieved in a transformer comprising an apertured core with which power and feedback windings are associated. The core is of substantially linear magnetic material having a common leg branched at the ends with the branches being interconnected to form at least two closed magnetic paths. One configuration is a figure "8" such as is fabricated from two "E" cores. A small aperture is provided near one end of the common leg around which a small virtual toroid is formed, consisting of three contiguous regions defining flux paths about the aperture. (Alternate configuration are "I", "T" and single "E" cores.)

The power winding encircles the common leg for generating main flux in the two closed magnetic paths and leaves the region between these paths and above the aperture substantially free of main flux. The primary feedback winding is wound through the aperture for generating a circulating flux about the virtual toroid. The secondary feedback winding is wound through the aperture for coupling to the region free of main flux. The secondary feedback winding derives a control output which reverses upon saturation of one of the toroidal regions.

The transformer is typically energized with the main power winding and the primary feedback winding being connected in series. By joint energization, which fixes the relative sense of current in the windings, the primary feedback winding generates a circulating flux around the virtual toroid having a first direction of increase in the region of the toroid initially free of the main flux, the same direction of increase as the main flux in a second region of the toroid and an opposite direction of increase as the main flux in a third region of the toroid, predisposing the second region to prior saturation.

When the control winding is coupled to a high resistance load, and after the second region saturates, particularly in the double E core configuration, main flux is steered through the field free region, coupling the main power winding to the secondary feedback winding so as to form a second virtual current transformer. The output of the second current transformer is in a sense opposite to the sense of the virtual current transformer formed by the primary and secondary windings.

The transformer is typically associated with a switching transistor with current to the main power winding being conducted through the principal electrodes of the transistor and the secondary feedback winding being coupled between the base and emitter electrodes of the transistor. In this circuit, a substantially constant input junction voltage drop ($V_{be}$) is maintained across the secondary feedback winding while the transistor is conductive. The ratio of the voltage drop to the inductance ($L_b$) of the secondary feedback winding constrains a predetermined substantially constant rate of change of flux ($\phi_t$) in the secondary feedback winding. The drive applied to the control transistor is thus a time dependent function of the relevant reluctance, acting to couple the primary and secondary feedback windings together. Mathematically, the base drive may be expressed as the difference between a positive term proportional to the turns ratio and the collector current ("$N_c I_c$")/$N_b$ and a negative time dependent term $V_{bc}/L_b$ t where $L_b$ is the inductance of the secondary winding. The inductance is in turn inversely proportional to the relevant reluctance. As each conduction period starts, the base current waveform increases initially in proportion to current through the transistor until it reaches a positive value approximated by the positive term. Then it decays slowly with time as a function of the reluctance presented by the virtual toroid to flux effecting these windings. At the instant of saturation of one toroidal region, the flux must now take a higher reluctance path, often through an air gap, and the reluctance coupling these windings suddenly increases, causing a steeper downward slope of the negative term. In a short time, the increased reluctance produces a strongly negative base drive, which continues until all stored charge is removed from the transistor, and it becomes fully nonconductive.

BRIEF DESCRIPTION OF THE DRAWINGS

The novel and distinctive features of the invention and set forth in the claims appended to the present application. The invention itself, however, together with further objects and advantages thereof may best be understood by reference to the following description and accompanying drawings in which:

DESCRIPTION OF THE PREFERRED EMBODIMENT

Figure 1:
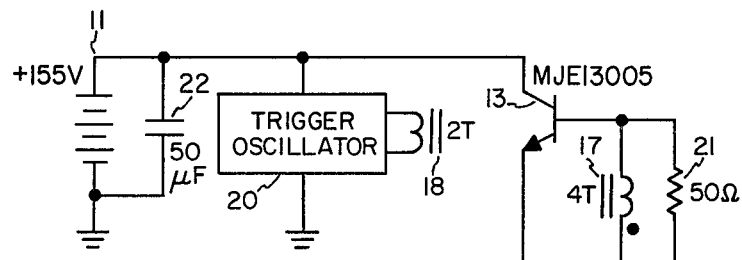
FIG. 1 is an electrical circuit diagram illustrating the novel power transformer exhibiting a saturation dependent feedback characteristic used in a high frequency switching series lamp ballast circuit.

A transformer in accordance with the invention is shown in FIG. 1 in a high frequency switching series lamp ballast circuit. The lamp ballast is illustrated in FIG. 1 in association with a dc supply 11 and a light source 12, typically a gas discharge lamp. In the example, the light source requires dc energization at a lower voltage than that of the dc supply (e.g. 65 volts dc). The principal elements of the ballast include a switching transistor 13; the power transformer 14 which has a main power winding 15 and control windings 16, 17 and 18; a current maintenance or "flyback" diode 19; a trigger oscillator 20 for controlling the switching rate of the transistor; a base connected resistance 21; and a filter capacitor 22.

The elements of the lamp ballast circuit are interconnected as follows. The dc supply 11, whose output is typically +145 V with appreciable 120 Hz ripple under load (e.g. ±10%) derives its energy from rectification of current supplied from a 120 V, 60 Hz sources. The filter capacitor 22 and the trigger oscillator 20 are connected across the output terminals of the dc supply, the negative one of which is grounded. The current supplied from 11 to the light source 12 passes through the transistor 13 and the transformer windings 16 and 15. More particularly, the collector of transistor 13 is connected to the positive terminal of the supply 11 and the emitter of the transistor is connected to the undotted terminal of the primary feedback winding 16. The dotted terminal of the feedback winding 16 is connected to the upper terminal of the main power winding 15. The other terminal of winding 15 is connected to one terminal of the light source 12. The other light source terminal is grounded. The connection between the windings 15 and 16 is connected through the diode 19 to ground, the diode having its anode grounded. The secondary feedback winding 17 is coupled between the base and the emitter of transistor 13 with the dotted end of the winding being coupled to the emitter. The resistance 21 shunts the winding 17. Finally, the output of the trigger oscillator 20 is connected to the transformer control winding 18 which is magnetically coupled to winding 17 for turning on the transistor 13 at a desired rate. As will be seen, turn off is determined by the transformer 14 and other circuit parameters.

Figure 3:
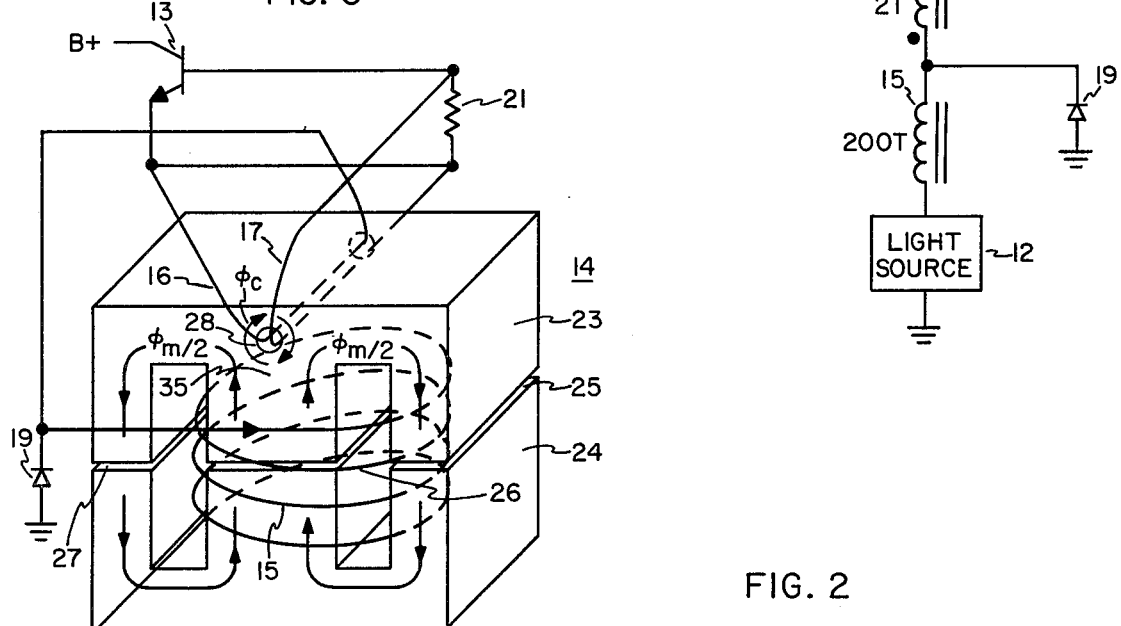
FIG. 3 is a mechanical drawing showing a transformer in accordance with the invention utilizing a composite figure "8" core.

The mechanical construction of the transformer 14 is illustrated in FIG. 3. The windings 15, 16, 17 and 18 (which is not shown) are assembled on a pair of "E" cores 23, 24. The "E" cores are assembled to form a composite core having a rectangular figure "8" configuration, with optional air gaps 25, 26 and 27 at each of the three core joints. The main power winding 15, typically of 200 turns, is wound about the central leg of the core. As illustrated, assuming current flow into the upper end of the winding 15 and out at the lower end, the main flux $\phi_m$ flows from bottom to the top of the center leg and branches equally at the ends of the center leg. Half the main flux ($\phi_{m/2}$) pursues a counterclockwise course around the left loop of the composite core and the other half of the main flux ($\phi_{m/2}$) pursues a clockwise course around the right loop of the composite core.

The control windings 16, 17 and 18 of the power transformer are wound through an aperture 28 provided in the "E" core near the upper end of the center leg. As illustrated in FIGS. 3 and 4, the aperture is small in relation to the cross section of the core while being large enough for insertion of the three control windings. In the present embodiment, the aperture must be large enough to accommodate 8 turns. The aperture is located on the center line of the center leg close to the root of the center leg. Both aspects of aperture positioning may be changed to suit the application. One object of positioning of the aperture is to create a region above the aperture which is free or substantially free of the main flux, absent saturation effects. In other words, the aperture is placed so that the control windings 16, 17, 18, which are coupled through the aperture, will be uncoupled or "neutral" or "orthogonal" to main flux generated by the main power winding in the absence of saturation effects.

The control windings 16, 17 and 18 are wound as follows: The emitter connected end of the two turn primary feedback winding 16 enters the aperture 28 on the front face of the core and exits on the back face for connection to the upper terminal of the main power winding 15. The base connected terminal of the secondary feedback winding 17 enters the aperture on the front face of the core and exits at the back face of the core for connection to the emitter of transistor 13. The control winding 18, associated with triggered operation of the transistor 13 is also wound through the aperture 28 but is not illustrated in FIG. 3.

The control windings 16 and 17, considered independently of the main power winding 15, form a current transformer. When no portion of the core is saturated, the core of the current transformer is a small, low reluctance virtual toroid. The center of the toroid is the aperture 28 and its boundaries during this condition are the adjacent boundaries of the upper leg and center leg of the composite "8" core. Expressed in another manner, the virtual toroid consists of three contiguous regions (31, 32, 33 of FIG. 4). The first region 31 connects the upper half 35 of the central leg to the left half 36 of the upper leg and provides a path for both main flux in the left hand loop of the "8" core and for flux circulating in the toroid. The second region 32 connects the right half 37 of the upper leg to the upper half of the central leg and provides a path for both the main flux circulating in the right hand loop of the "8" core and for flux circulating in the toroid. The third region 33 lies in the upper leg and interconnects the left and the right halves 36, 37. Absent saturation or hole asymmetry, very little of the main flux and only toroidal flux flows through the third region 33.

Figure 4A:
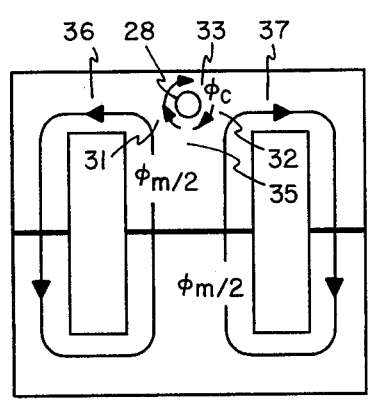
FIGS. 4a, 4b and 4c are drawings illustrating the senses and paths of the magnetic fields in the core of the power transformer before and after saturation with different loads.

Operating together, the three windings 15, 16 and 17 provide the mechanism for providing conduction aiding feedback prior to the attainment of a prescribed level of flux in the core, and conduction inhibiting feedback afterwards. In FIG. 4a the flux conditions are shown, assuming that no region of the core has yet saturated. From inspection, it may be seen that, if appreciable current flows in both windings 15 and 16, that the highest flux concentrations should be expected to occur where flux from both windings is present. More particularly, the flux ($\phi_c$) from the primary control winding 16 is to be expected to be confined primarily to the regions 31, 32, 33 of the virtual toroid encircling the aperture 29. The flux ($\phi_m$) from the main power winding 15 flows through regions 31 ($\phi_{m/2}$) and 32 ($\phi_{m/2}$) but generally avoids region 33. Since the windings 15 and 16 are serially connected, current will be in the same sense in both and will increase in both together. As a result, the relative senses of the main and circulating fluxes will be fixed, as for instance as illustrated in FIG. 4a. Thus, during a conduction cycle, the main flux ($\phi_{m/2}$) flowing in the left hand loop of the core will pass upwardly through the region 31, and the circulating flux ($\phi_c$) going clockwise around the virtual toroid will also pass upwardly through region 31. In region 31, the two fluxes $\phi_{m/2}$ and $\phi_c$ will add and the flux density will be largest. In region 32, the main flux and circulating flux will be in mutual opposition and partially cancel ($\phi_{m/2} - \phi_c$), resulting in a lower total flux. In the third region 33, only circulating flux will be present. Thus, through some range of low current levels, more flux will occur in region 31 than in the regions 32 and 33. Should the current in the windings continue to increase, region 31 which has the highest flux, may be expected to saturate first.

Figure 4B:
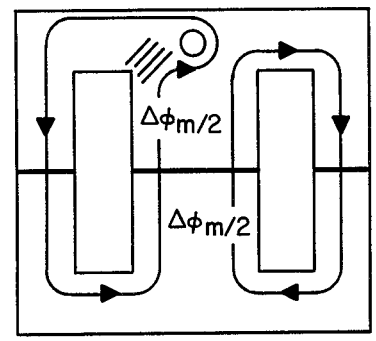

When region 31 saturates, additional incremental flux may be expected to seek out other paths, and to alter the control relationships implied in FIG. 4a. Prior to saturation of region 31, the secondary feedback winding 17, as explained earlier, is coupled to circulating flux $\phi_c$ attributable to the primary control winding 16, and uncoupled to the main flux $\phi_m$. The sense of the drive applied to the base of transistor 17 is conduction aiding. FIG. 4b illustrates the change which occurs when region 31 saturates. When region 31 saturates, the core coupling between the primary and secondary control windings 16 and 17 is substantially reduced. Saturation in effect introduces an air gap into the toroid and greatly increases the reluctance in the flux path and thus decreases the coupling between the control windings 16, 17. At the same time, neglecting any loading produced in the secondary feedback winding circuit, any further increase in transistor current will cause an increase in the main flux, and the main flux will tend to continue to increase in both major loops of the core as shown in FIG. 4b.

Since the flux path through region 31 is of high reluctance, due to saturation, the additional main flux normally pursuing a path through 31, will seek out the next lower reluctance path which is normally the "neutral" region 33. When this occurs, the main flux $\phi_m$ will be in a sense opposite to that of the circulating flux and the rate of change of flux will also oppose that of the primary control winding which has fewer turns. When the main flux increases to the point where the total rate of change of flux in region 33 reverses in sense, the sense of the feedback applied to the secondary feedback winding 17 will reverse. Thus, after a predetermined flux density has been achieved, causing saturation of region 31, the rate of change of flux in region 33 will change in sign under the influence of the main flux steering into region 33 and incremental main flux will now be coupled to the secondary feedback winding. The effect of saturation of region 31 is to create a second current transformer in which the primary winding is the main power winding 15, and secondary winding is the secondary control winding 17.

A saturation dependent relationship between the primary power winding 15 and the secondary feedback winding 17 may be further explained. The shunted current transformer, which these windings form, does not exist until region 31 has saturated, diverting flux into region 33. As has been earlier noted, the main flux splits in the vicinity of the aperture 28 and ideally no main flux passes through the third region 33 with which the secondary feedback winding 17 is coupled. Should region 31 saturate, as the main flux continues to increase, then the main flux in the right hand loop may continue in the same path as before, passing through the region 32. At the same time, part of the main flux increment may pursue a counterclockwise path around the aperture 28, by-passing the saturated region 31. In this mode of operation, the main flux will pass through the third region, and circulate in a sense opposite to the flux normally circulating in the region 33. The redirected main flux, if great enough, may reverse the rate of change of flux in region 33 and with it the sense of the feedback derived by the secondary feedback winding 17 as earlier discussed.

The foregoing intuitive analysis in which reversal of the feedback sense is attributed to the steering of incremental increases in the main flux into region 31 must be modified with regard to the nature of the load imposed upon the secondary feedback winding. With a relatively high resistance load, by which induced current in the secondary control winding is held low, the Lenz law effects of induced secondary current tending to oppose the growth of flux in the region 33, due either to the primary control winding 16 or the main power winding 15, is reduced. Under these conditions, the intuitive analysis is substantially accurate and the field conditions will be as illustrated in FIG. 4b. Should the secondary feedback winding be shorted, the Lenz law effect would be maximum, and both modes of transformer coupling would be largely thwarted. Finally, one must take into account the effect of a load which consists of the input junction of a transistor which tends to sustain a constant junction voltage drop ($V_{be}$) so long as the transistor remains conductive, and the nature of the source driving this load, i.e., the secondary feedback winding, having appreciable inductance. The net effect of the base-emitter connection to the feedback winding 17 is to hold the rate of change of flux in the region 31 ($\phi_t°$) to a constant value during the terminal portion of each conduction period. As will be seen, this provides a mechanism for reversing the sense of the base drive, which does not require a continuing increase in transistor current, or a diversion of main flux into the region 33.

The mathematical analysis requires consideration of the reluctances of the paths followed by the circulating and main fluxes before and after saturation of region 31.

During unsaturated operation, the current transformer consisting of the primary feedback winding 16, the secondary feedback winding 17 and the virtual toroid 31, 32, 33 tightly coupling them together, operates independently of the primary power winding 15 and the main flux ($\phi_m$) it generates. The primary feedback winding 16 generates a flux ($\phi_c$) tending to circulate in the three identified regions 31, 32, 33 defining a virtual toroid of low reluctance and tending not to flow in any of the larger rectangular paths permitted by the core structure. This is particularly true when air gaps increase the reluctance of the larger paths in relation to that of the virtual toroid. The secondary feedback winding 16, which is magnetically coupled to the third region only, is decoupled from the main flux produced by the main power winding 15 in the unsaturated condition, when the aperture 28 is symmetrically placed to be in a "neutral" or field free region mid-way between the two main flux paths.

Figure 4C:
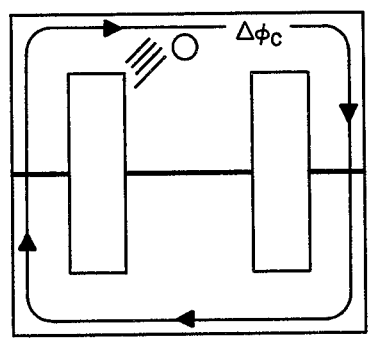

The configuration permits a second, higher reluctance mode of core coupling between the control windings 16 and 17 of the current transformer. This coupling comes into play when saturation interrupts the flux paths in the small virtual toroid. In the second mode, the additional flux generated by the primary feedback winding 16 follows a path (which may be branched) around the outer rectangle of the composite "8" core as illustrated in FIG. 4c. More particularly, the flux which is initiated in region 33 and passes from left to right through that region (using the orientations of the FIG. 3 illustration), may continue into the upper right leg 37, down the right leg (crossing the air gap 25), across the lower leg and then up the left leg of the core (crossing the air gap 27) and then returning through the upper left leg 36 to the region 33. In addition to the rectangular path just described, and dependent on the extent to which the region 31 is saturated, the central leg may provide a shunt to the flux pursuing the outer rectangular path just described. In addition, the saturated region in the toroid will create an equivalent air gap in the toroid itself through which some flux may flow. Due to the presence of the air gaps 25, 27 and 26, the alternate paths have substantially greater reluctance than that of the virtual toroid formed when regions 31, 32 and 33 are unsaturated. As will be seen, the alternate flux path for circulating flux provides a mechanism for reversing the sense of the feedback supplied to the transistor by the transformer 14.

One may mathematically describe the reversal in the sense of the feedback attributable to the increase in reluctance in the magnetic path coupling the secondary feedback winding 16 to the primary feedback winding 17 which occurs when one toroidal region saturates. This mechanism requires that the secondary feedback winding be coupled across a constant voltage load, as for instance, the input junction of a transistor whose junction drop ($V_{bc}$) remains substantially constant so long as current flows in the junction, and requires the presence of substantial inductance in the secondary feedback winding.

Figure 2:
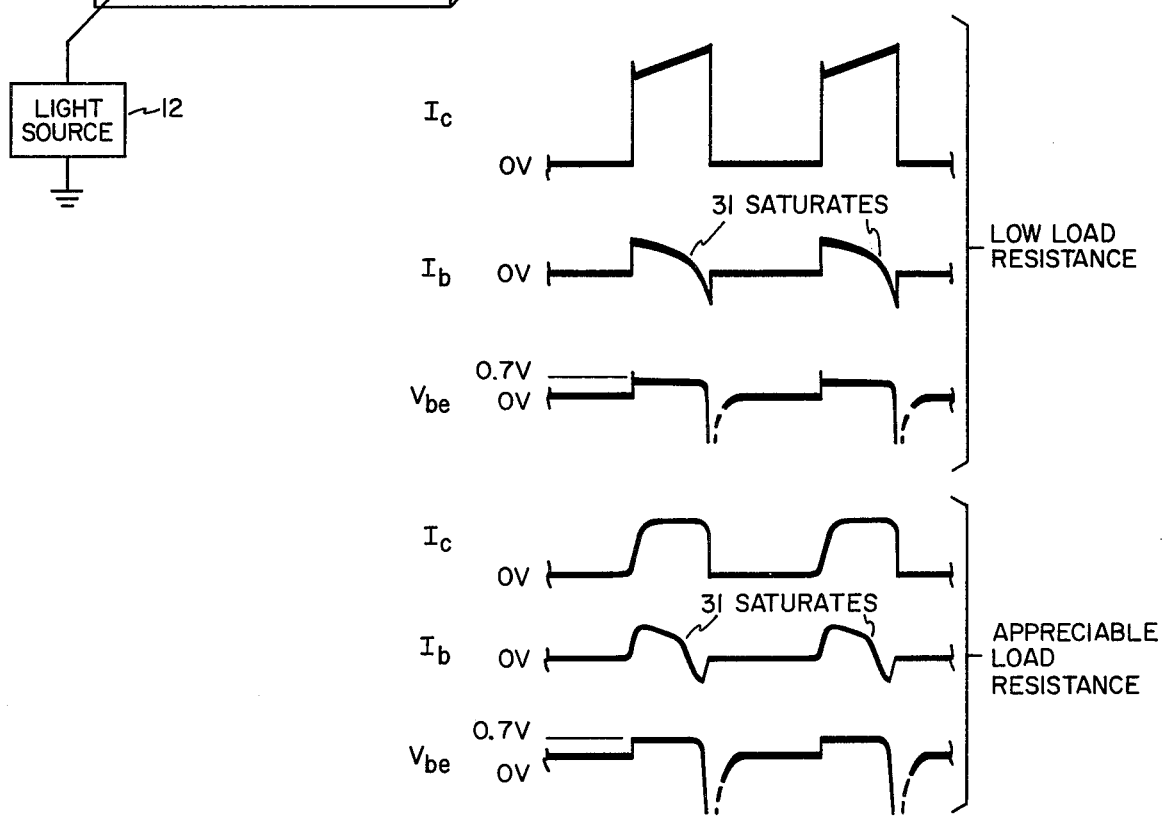
FIG. 2 illustrates six waveforms useful in explaining the operation of the power transformer illustrated in FIG. 1.

The waveforms of FIG. 2 illustrate this mode of feedback reversal. The three upper waveforms of FIG. 2 illustrate respectively the collector current waveform, the base current waveform and the base-emitter voltage, under conditions in which the inductance of the power transformer is large and the light source has a comparatively small resistance. The three lower waveforms illustrate the same variables under conditions in which the inductance of the power transformer is as before and the light source has appreciable resistance. Under a low resistance load, the collector current may continue to increase throughout the conduction period of the transistor with a slope determined by the voltage across the primary winding divided by inductance of the main power winding. The current applied to the base of the transistor, assuming the circuit connections of FIG. 1, will quickly step to a strong positive (or conduction inducing) condition which decreases gradually until region 31 saturates. When region 31 saturates, the base drive slopes downward sharply until the base drive is reversed. The reversal continues until any stored charge is swept out of the transistor junction, at which point the reverse base current is extinguished. The $V_{be}$ throughout the conduction period holds at a substantially constant value, until the instant at which the stored change depletes in the reverse conduction mode. Then it snaps to zero.

The last three graphs of FIG. 2 illustrate the conditions where there is greater resistance in the load and the collector current reaches a plateau early in the conduction interval. Under these conditions, the collector current may increase gradually at the beginning of the conduction interval and then flatten out for the remainder of the conduction interval. With the collector current fixed, the main flux cannot increase. This may be explained as a leveling off of the magnetomotive force—the (NI) in the main power windings or as a termination of significant increments in the voltage-time area integration. The slope of the collector current graph implies continuing voltage due to the inductive component of the main power winding ($e_L = L(di/dt)$). When the slope of the collector current becomes zero, the inductive voltage also becomes zero. With the collector current fixed, the circulating flux attributable to the collector current is also fixed. The base current drive produced under these circumstances is illustrated in the graph immediately below the collector current graph. Here, the base current climbs initially in proportion to the increase in collector current. Then, as the collector current stabilizes the base current decreases with a gradual downward slope. With saturation, the slope sharply decreases until the base drive is reversed. As will be shown, the gradual slope is a function of the reluctance of the toroid coupling the primary feedback winding 16 to the secondary feedback winding 17. This slope will be small when the reluctance of the toroid is small. The steeper slope occurring after saturation of region 31 is due to the increased reluctance of the larger flux path. Throughout the conduction period, the base emitter voltage holds substantially constant, stepping to a strongly negative value as stored charge is removed from the transistor junction. Prior to a more detailed mathematical treatment of these matters, the operation of the working circuit illustrated in FIG. 1 will be described.

The transformer function has been taken in a context assuming that a transistor switch is turned on at regularly spaced intervals by another means via the control windings 17, 18 and that it is the function of the transformer to determine the length of the conduction period following each conduction start. In general, the duration of the conduction interval is set by the time that it takes to saturate the region 31 in the vicinity of the aperture and to bring about the reversal in base drive.

The lamp ballast circuit illustrated in FIG. 1 provides dc voltage (subject to ±10% 120 hertz ripple) for normal running operation of the light source 12. The operating circuit is not in itself the subject of the present invention. The transistor 13 is a series switch which is periodically turned on by the trigger oscillator 20 at a frequency of 22 KHz. The trigger oscillator produces high current (0.100 amperes) short duration (500 nanosecond) pulses of the correct polarity to turn on the switching transistor 13. Once the transistor is turned on, collector current begins to flow through the primary feedback winding 16. The consequence of an increase in current in the primary feedback winding is a current induced in the secondary feedback winding 17. The induced current (substantially one-half the primary current) is in a sense tending to increase transistor conduction, and bring it to a fully conductive "saturated" state. With the transistor 13 conductive, current begins to flow from the dc source, through winding 16, into the main power winding 15, and thence to the light source 12. The current build-up in the transistor continues and the flux in the transformer core continues to increase until region 31 saturates. When region 31 saturates, the conduction aiding current which accompanied the start-up of conduction is suspended, and conduction inhibiting current is applied. Conduction inhibiting current continues until any charge stored in the transistor is removed and the transistor is left completely non-conductive.

Current to the load is supplied during the transistor off time from inductive energy stored in the winding 15 by means of the current maintenance or "flyback" diode 19. The diode 19 is reversely poled while the transistor 13 is conductive by virtue of the connection of its cathode to an intermediate tap on the impedance between the positive source and ground and the connection of its anode to ground. As the transistor becomes nonconductive, however, the energy stored in the magnetic field of the main power winding 15 tends to continue to maintain current in the winding. The diode 19, connected in a closed loop, including the winding 15 and the lamp 12, provides a path for the inductively sustained current. With the momentary change of the inductive impedance to an "apparent" generator and the opening of the switch connecting the upper winding terminal to the positive source terminal, the diode 19 becomes forward biased, allowing the inductively sustained current to flow through the lamp.

The inductance of winding 15 filters out most of the 22 KHz ripple from the load 12. During the transistor conduction period, when energy is supplied to the circuit, the load current is stabilized by the transformer inductance. During transistor nonconduction, the diode 19 provides a suitable current path for the inductively sustained current and the inductance thus continues to hold the load current steady. The degree of filtering is also dependent upon the load, decreasing slightly as the load current increases. Normally, the transistor switching rate (e.g. 22 KHz) is sufficiently high to reduce the high frequency ripple to unobjectionable levels.

The reversal in drive, which occurs when the transformer secondary is coupled to the input junction of a transistor and which may take place whether the collector current reaches a stable state or not during the conduction cycle, may be explained as follows:

From Ampere's law, the magnetic potentials along a magnetic path, summed along the path, equals the sums of the magnetomotive forces coupled to the magnetic path:

$$\Sigma H \Delta l = \Sigma N_i I_i \tag{1}$$

In the virtual toroid, the collector current ($I_c$) flowing through the collector turns $N_c$ of the primary feedback winding 16 produces a magnetomotive force creating a clockwise flux around the aperture 28. Base current $I_b$ induced in the secondary feedback winding 17 of $N_b$ turns produces a second magnetomotive force which, in accordance with Lenz' law, produces a counterclockwise field around aperture 28 opposing the field due to the collector current.

The difference between the two magnetomotive forces is equal to the summation of the magnetic potentials:

$$N_c I_c - N_b i_b = \Sigma H \Delta l \tag{2}$$

The magnetic field quantities are interrelated as follows:

$$\phi = \int_s B \, dA = BA = \mu H A$$

where
$\phi$ is the magnetic flux
A is the area
B is magnetic induction
$\mu$ is the permeability
H is the magnetic field intensity Over an arbitrary length (l) of core, the magnetic potential $$U_L = Hl = \frac{\phi l}{\mu A}$$

where $l/\mu A$ is defined as the reluctance.
Re-expressed, expression (2) becomes:

$$N_c i_c - N_b i_b = \frac{\phi_l l}{\mu A} \tag{3}$$

where $\phi_t$ is the total flux in region 33 of the virtual toroid. Solving for $i_b$:

$$i_b = \frac{N_c i_c}{N_b} - \frac{\phi_t l}{N_b \mu A} \tag{4}$$

To determine $i_b$, the flux $\phi_t$ must be known. This may be done by application of Faraday's law.

The emf derived in the secondary feedback winding 17 is proportional to the turns and the rate of change of flux.

$$\mathrm{emf}_b = N_b \dot{\phi}_t \tag{5}$$

But it is known and is observed that $\mathrm{emf}_{(b)}$ is the voltage drop across the input junction of transistor 13, which remains substantially constant under quite large ranges of current including base current reversal. Thus, $$V_{be} = N_b \dot{\phi}_t \tag{6}$$

and $$\dot{\phi}_t = \frac{V_{be}}{N_b}$$

In other words, the rate of change of the total flux in the region 33 is fixed by the constant value of the $V_{be}$ drop of the transistor input junction and the number of turns in the base winding. Integrating the time rate of change of flux over time to obtain the total flux at any particular time:

$$\phi_t = \int \frac{V_{be}}{N_b} dt = \frac{V_{be}}{N_b} t + c \tag{7}$$

where c is a constant of integration, normally zero. This value for $\phi_t$ may be set into expression (2)

$$i_b = \frac{N_c i_c}{N_b} - \frac{V_{be}}{N_b^2} \left( \frac{l}{\mu A} \right) t \tag{8}$$

which may be rewritten $$i_b = \frac{N_c i_c}{N_b} - \frac{V_{be}}{L_b} t \tag{9}$$

where $L_b$ is the inductance of the secondary feedback winding.

The main flux $\phi_m$ and the collector current $I_c$ approach their asymtotic values when the resistance in the load is high relative to the primary inductance. The collector current $I_c$ becomes constant as observed in the lower graph of FIG. 2. This forces the initial quantity in expression (8)

$$+ \frac{N_c}{N_b} i_c$$

to be constant, and positive. The second quantity $$- \left( \frac{V_{be}}{N_b^2} \right) \left( \frac{l}{\mu A} \right) t$$

is both explicitly and implicitly time dependent. It is of a negative sign implying a reversal in sense of the drive provided by the first term. The quantity ($l/\mu A$) is the reluctance of the relevant core structure. With a small reluctance, the downward slope with time is small. This low reluctance condition exists when the small toroid is unsaturated. When region 31 saturates, the reluctance is now the parallel combination of the larger flux path and the effective air gap provided by the saturated region and the reluctance increases significantly. With the larger reluctance condition, the downward slope with time of the second quantity is large and with suitable dimensions, the base current will be driven to a strong negative value until all charge stored in the junction is removed. The reverse drive is extinguished as the transistor enters the nonconductive portion of the cycle.

While the analyzed case assumes that the collector current has stabilized early in the conduction cycle, it may also be shown that the same turn off sequence will occur had the collector current not stabilized. Should the main flux continue to increase throughout the conduction cycle, the indicated $V_{be}$ effect will continue to operate, precluding the entry of main flux into the third region (33). This clamping of the ($\dot{\phi}_t$) will then continue until stored charge is swept out of the transistor. When that happens, the $V_{be}$ collapses with the end of the conduction cycle. The $\dot{\phi}_t$ clamping may not be present when a resistance is associated with the transistor effectively swamping or deregulating the voltage across the secondary feedback winding.

Figure 5:
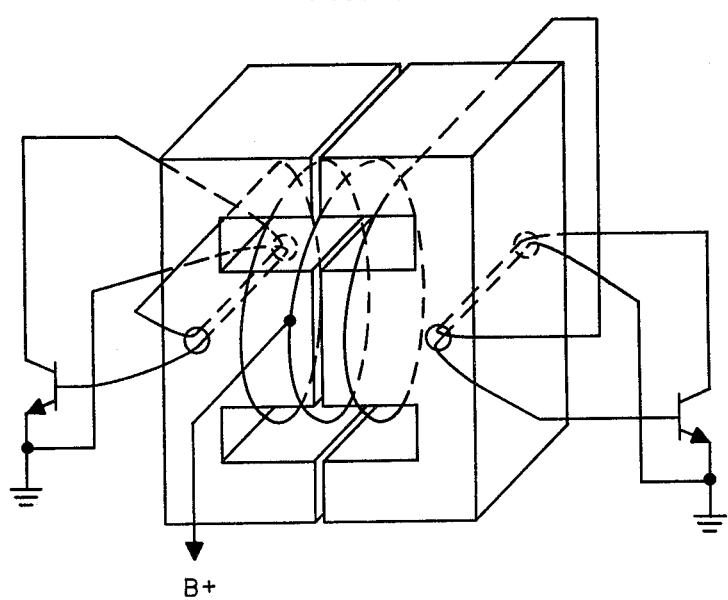
FIG. 5 illustrates a transformer designed for use in a two transistor configuration.

While the FIG. 1 embodiment illustrates a transformer suited for use with a single switching transistor, the transformer may also be used with two switching transistors with a second aperture at the other extremity of the central leg of the core as illustrated in FIG. 5.

A typical core suitable for use with a 40 watt light source may be constructed of two "E" cores type TDK EE 30 Z H3SL. The core is of a medium frequency ferrite suitable for use at 20-40 KHz and contains outer legs 5 mm.×11 mm. in cross section and a central leg 11 mm. ×11 mm. in cross section. Non-magnetic shims of 0.005" thickness are placed at the joints between the cores. The aperture 28 for the control windings is placed on the center line of the central leg 0.11" from the outer surface. The aperture is 0.08" in diameter. The "bobbin" window allocated for the main winding, when the two "E" cores are assembled, is 16 mm.×4½ mm.

In principle, the aperture should not be offset from the center line of the central leg past the point where the main flux coupled into the secondary feedback winding is greater than flux from the primary feedback winding to the secondary feedback winding. It is customary to place the aperture as close as practical to the neutral or field free region of the main flux. The preferred aperture position may still be offset from the center line of the central leg if one of the outer loops has a greater air gap than the other or the leg cross sections are not alike and still be in a field free region. Some compensation for unintended inaccuracy in positioning the aperture is possible by air gap adjustment. Within the same limiting principle, and assuming a centered aperture, one may introduce slightly asymmetric air gaps to adjust the conduction period and power.

The transformer herein described is applicable to a wide range of practical inverter applications. The operating frequency of the inverter may lie within a wide frequency range, typically from 10 Hz to 200 KHz. In each application, the core material should be selected for efficient operation at the selected frequency, and the load time constant and the intrinsic time constant of the saturation turn off mechanism should be optimized for overall operating efficiency.

While the inverter has been shown in an arrangement in which the switching transistor is turned on by a trigger pulse applied through an additional winding in the aperture, energized from an independent oscillator, and turned off by the natural time constant of the transformer, one may also use the transformer for effecting both turn on and turn off control. Suitable circuits of this nature are shown in the copending application of Hesler et al, Ser. No. 956,578, entitled "Static Inverter Employing an Assymetrically Energized Inductor", and assigned to the present Assignee.

Figure 6:
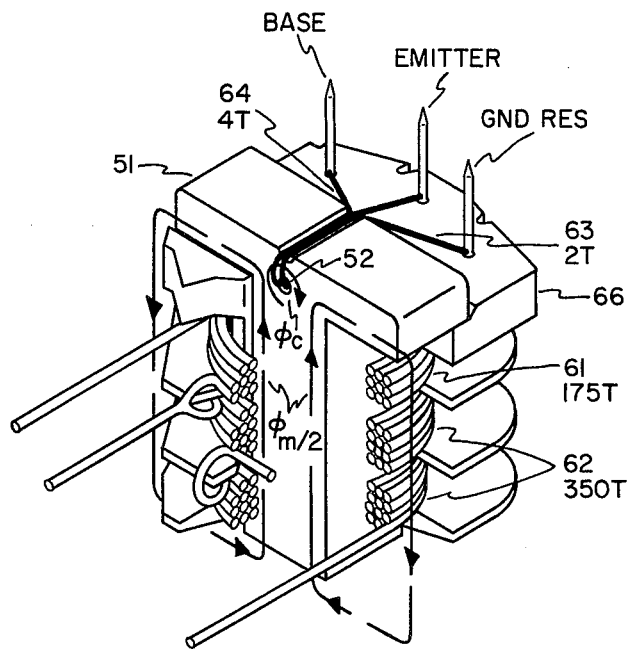
FIG. 6 illustrates a transformer having a "T" core.
Figure 7:
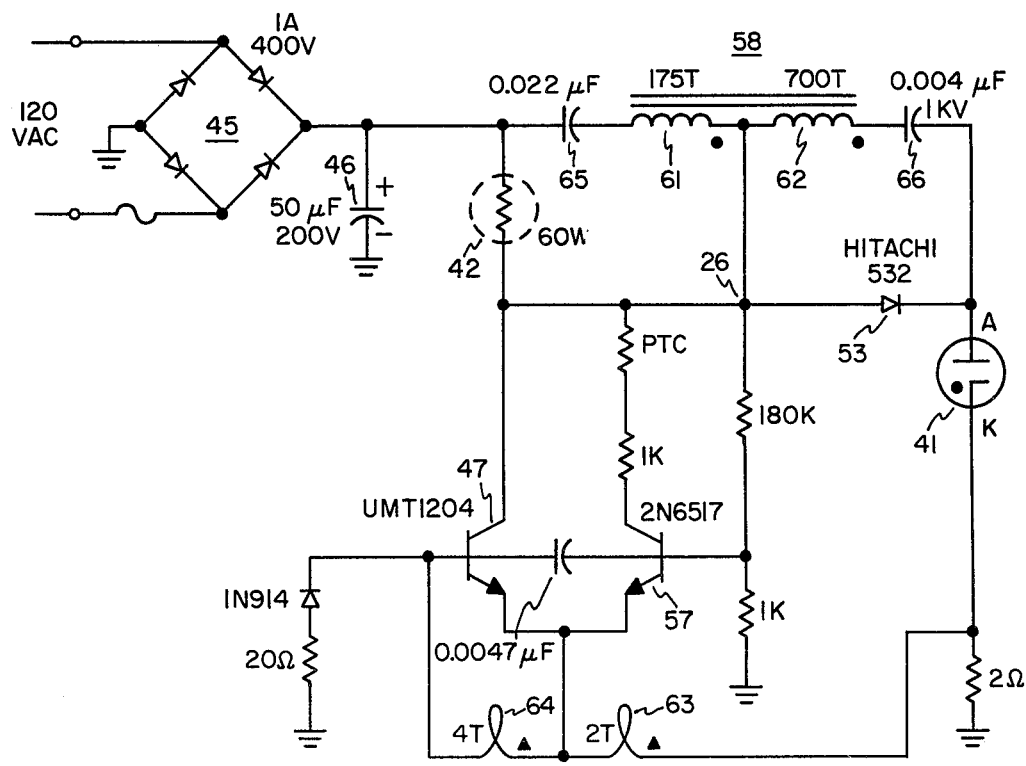
FIG. 7 illustrates an inverter suitable for operation of a low wattage metal vapor lamp.

A simplified transformer designed to start a low wattage metal halide lamp is shown in FIG. 6. The transformer is a component of the power supply whose circuit diagram is illustrated in FIG. 7. The transformer has its windings connected as illustrated in FIG. 7 and the mechanical configuration illustrated in FIG. 6. In this application, which is for conventional home use, the power supply is required to provide an ignition voltage of 1600 volts peak (50 KHz); power for the glow to arc transition of 8 watts at 300 volts (50 KHz); early warm-up power of 20 volts at 0.6 amperes (dc) and final run power of 90 volts at 0.35 amperes (dc). Power is also supplied to a standby filament which reaches 60 watts (50 KHz) when the arc lamp is in the hot restart mode and is not itself drawing power. DC power is also supplied to the filament and phased out as the arc lamp warm up. The transformer participates in the 50 KHz high frequency operation during starting, and is quiescent when the lamp enters the dc warm-up and final run condition.

The transformer itself is shown at 58 in FIG. 7 and consists of the main power windings 61 and 62, the feedback windings 63 and 64 and the apertured tee-shaped core 51 best illustrated in FIG. 6. By "tee-shaped" one means that the approximate shape of the core is like a Gothic "T". Practically, this means that the core shape is approximately that of a first bar section being joined at one end to the mid-section of a second bar, the axis of the two being mutually orthogonal, and the construction being in fact unitary. The essential function of this geometry is that the core is efficiently linked with the main power windings 61, 62 in respect to main flux passing within the windings and then branching into separate loops in a figure eight-like flux configuration. The portion of the core lying within the winding is shared by main flux in both loops passing from one end to the other within the winding. One half of the top bar is a conduit for the main flux outside the windings circulating in one loop and the other half of the top bar is a conduit for main flux outside of the windings circulating in the other loop. While the construction is normally rectangular for ease in housing the bobbin, it should be clear that corners may be rounded, grooving may be provided for the windings, and the top bar halves, particularly, may be curved down to follow the curving lines of the flux.

The first bar resembling the stem of the "T" will hereinafter be referred to as the "stem" or "central" bar since it is disposed along the central axis of the helical coil. The second bar will hereinafter be referred to as the "top" bar by virtue of its resemblance to the horizontal or top stroke of a Gothic "T" and by virtue of its position across one end of the helical winding, which may be arbitrarily designed the "top".

As also seen in FIG. 6, the windings 61 and 62 are wound on the bobbin which surrounds the stem of the tee-shaped core. The windings 63 and 64 are inserted through the aperture 51 and wound about the top of the core. The tee-shaped core is inserted into a bobbin 68 and the transformer unit is mounted with the top of the tee supported in proximity to an overlying circuit substrate through which the leads extend. The leads are then soldered into position on the substrate to support the transformer.

The circuit illustrated in FIG. 7 is the subject of U.S. application Ser. No. 47,972. The following general outline of circuit functions will be useful in understanding the properties of the transformer. The operating circuit of the lighting unit provides power for both the arc lamp 41 and for a standby filament 42, which is also used as a resistive ballast during final run, dc operation. The energization for the operating circuit is provided by a dc supply connected to the 120 volt ac outlet which consists of a rectifier 45 and a filter capacitor 46. The output of the dc supply is interrupted at the 50 KHz rate by means of a solid state switch comprising transistor 47 and its associated circuitry. By virtue of the reversal in feedback sense provided by the transformer 58, acting through the secondary feedback winding 64, the transistor 47 operates in a monostable mode. In other words, once turned on, it conducts for a limited period of time and then turns off as a result of feedback reversal. Periodic operation of the transistor switch is achieved by a trigger oscillator consisting of the transistor 57 and its associated components. High frequency operation terminates when the arc lamp enters warm-up. In the final run mode, dc power is provided to arc lamp 41 through a path including the filamentary ballast 42, and the diode 53.

The transformer illustrated in FIG. 6 represents a low cost version of the transformer illustrated in FIG. 3. More particularly, the costs of a two piece double E core have been reduced by use of a single piece T shaped core. In addition to the simplification of the assembly process, a one piece core avoids the need to accurately dimension the air gaps in a two piece assembly. The transformer using a T shaped core has greater leakage and thus different properties from a transformer using a double E core. The difference in transformer properties, assuming that similar operating requirements are required, may be offset by an adjustment of the winding counts and a few external circuit values primarily. More particularly, had a double E core been employed in the FIG. 7 arrangement, the winding 61 would have had 140 turns, the winding 62, 500 turns, the capacitor 65, 0.01 microfarads, and the capacitor 66, 820 picofarads. Using the T core, the winding 61 has 175 turns, the winding 62, 700 turns, the capacitor 65, 0.022 microfarads and the capacitor 66, 0.004 microfarads. The overall height of the T is 0.609" and the stem of the T is 0.187" square. The top bar of the T is 0.124" high measured along the axis of the stem and is 0.257" wide, measured orthogonal to the stem. The aperture 51 is placed where the stem merges with the top bar, on the axis of the stem. The diameter of the aperture is 0.04" on a center 0.084" from the top surface plane of the bar. To allow a winding to embrace the upper portion of the bar, a 0.030" radius, half circular groove, is located along the same center line leaving an actual core thickness directly above the hole of 0.69". The control windings are wound through the aperture 52 and rest in the groove of 54. In the double E core the cross section of the central branch is a 0.187"×0.187" square cross section as in the tee core and the top bar is slightly thinner when in an ungrooved configuration. The actual cross section over the aperture is 0.054" by 0.187". These dimensions are not critical but are exemplary and optimized for the intended application.

The transformer of FIG. 6 produces a reversal in drive in much the same manner as the double E core version illustrated in FIG. 3. More particularly, the tee core of Fig. 6 is designed to have only one alternate flux path after the toroidal region saturates. Using the three regions 31, 32, 33 as defined in FIG. 4A and assuming the same orientations in main flux and circulating flux in the tee core, one may expect the region 31 to saturate first as current in the transistor switch continues to increase. Assuming further that a transistor input junction is connected across the secondary feedback winding 64 as illustrated in both FIGS. 1 and 7, one may assume that the constraints on the rate of change of flux in region 33 will exist so long as the transistor input junction is active and retains stored charge. Thus, the transformer will operate in a reluctance change mode to effect a reversal in drive. Absent saturation of region 31, the reluctance of the toroid about the aperture 52 is very small. When region 31 saturates, the saturated region becomes an air gap and the magnetic structure similar to a horseshoe magnet with the flux passing through a virtual air gap at the saturated region between two pole pieces. With this configuration, the reluctance coupling the primary and secondary feedback windings increses and a drive reversal will come about in the same general manner as described in connection with the E core.

While the second embodiment of the invention has employed a tee core, one may in fact employ several other configurations. One may add outer arms to the tee core parallel to the stem so that the final core resembles a larger single E core with the outer arms extending down around the outer surface of the helical winding and the air gap existing between outer arm and stem. The configuration produces some further reduction in leakage flux, while retaining one piece construction and the use of slip-on assembly. Another variation of the E core is one in which the central branch is shortened in the direction of producing a "U" core. A shortened central bar is preferable to a non-existent one since it forces the main flux paths into closer proximity to the aperture and facilitates the regional saturation required for feedback reversal. It also helps in alignment. A further embodiment having quite similar properties to the tee core is a core in which the top arms are essentially lacking and the central core is in a "1" configuration. The length of the "1" core is normally equal to the length of the axis of the helical coil. The core axis may be lengthened or shortened, but in general the aperture should be near an end and at a region where the closed flux paths separate and do not re-close again around the aperture. The leakage in this configuration is largest but yet permits a sufficiently great change in reluctance to effect turn off of the switching transistor. The arrangement will produce eddy current losses in adjacent surfaces and in tight quarters may be less desirable than a tee core.

In each of the configurations in which the reluctance in the outer loops of the main flux is very large due to a lacking segment in the outer main flux paths, main flux cannot be steered easily through the top region 33 in a sense inverse to the circulating flux. For similar geometric reasons the l core—tee core—single E core configurations, provide a toroidal path which upon saturation, provides only one alternate path. That alternate path resembles that of a horseshoe magnet with other paths around the main flux loops being of too great reluctance to be of practical concern.

The placement of the primary and secondary control windings 16, 17 of FIG. 1 and 63, 64 of FIG. 6 on the outer region (33 of FIG. 4A) is the most convenient position to avoid interference with the main power windings and bobbin associated with the power windings. The essential element in the positioning of the primary control winding is that it couple to the toroid encircling the aperture. It need not be confined to the outer region of the toroid nor need it in fact fully embrace one of the three toroidal regions. For example, when the primary control winding is reduced to a single or fractional turn, it may be convenient to lead the near end of the main power winding directly through the aperture to form the primary control winding. The other end of the primary control winding may then be connected to one end of the secondary control winding which encircles the outer region. In this configuration, the primary control winding does not fully embrace any one of the toroidal regions. In passing through the aperture, the primary control winding develops a circulating flux in the surrounding toroid, which then couples to the secondary control winding and interacts with the main flux in the inner toroidal regions in the manner essential to drive reversal. As earlier stated, placement of the secondary control winding (17 of FIG. 1 and 64 of FIG. 6) on the other region is essential to drive reversal and preserves the "soft" current transformer action during drive reversal without the addition of external lossy elements. The "soft" action is characteristic of all configurations of the present invention.

What is claimed is:

1. A transformer comprising:
   A. a core of substantially linear magnetic material for main flux pursuing first and second closed magnetic paths arranged adjacently in a FIG. "8" configuration,
      a small aperture in said core disposed substantially at the boundary between flux paths for minimum interception of main flux, said closed paths separating at said aperture,
      said aperture being bounded by three contiguous regions collectively forming a small virtual toroid, the first region also providing a portion of the path for main flux in said first closed path, the second region also providing a portion of the path for main flux in the second closed magnetic path, and the third region providing a path between said first and second regions substantially free of main flux in the absence of saturation effects,
   B. a substantially helical power winding coupled to said core for generating and responding to main flux in said first and second closed flux paths,
   C. feedback winding means for deriving a control output having a sense which reverses upon saturation of a predetermined toroidal region, said means comprising:
      (1) a primary feedback winding wound through said aperture to generate flux about said virtual toroid; and
      (2) a secondary feedback winding wound through said aperture and embracing said third toroidal region for deriving a control output in response to flux therein.

2. A transformer as set forth in claim 1 wherein the reluctance of said toroid to flux generated by said primary feedback winding is smaller in the absence of saturation, any alternative flux paths, if said first or second region saturates, providing a substantially higher reluctance.

3. A transformer as set forth in claim 1 wherein said core extends along the axis of said power winding and comprising a center portion with a first end and a second end, said aperture being disposed near said first end.

4. A transformer as set forth in claim 3 wherein the reluctance of said toroid to flux generated by said primary feedback winding is smaller in the absence of saturation, saturation of said first or second region providing a virtual air gap and a horseshoelike magnetic structure of substantially higher reluctance.

5. A transformer as set forth in claim 3 wherein said core is extended at said one end to carry flux orthogonal to said axis symmetrically along with said first and second closed flux paths.

6. A transformer as set forth in claim 5 wherein said core has two linear portions joined to the orthogonal extensions of said center portion and extending parallel to said center portion.

7. A transformer as set forth in claim 3 wherein said core is tee-shaped to reduce flux extending axially beyond said one end, and permit mounting said one end on a metallic substrate with minimal eddy current losses.

8. A transformer as set forth in claim 7 wherein the reluctance of said toroid to flux generated by said primary feedback winding is smaller in the absence of saturation, saturation of said first or second region providing a virtual air gap and a horseshoelike magnetic structure of substantially higher reluctance.

9. A transformer as set forth in claim 1 wherein said core is a double E core arranged in a figure "8" configuration.

10. A transformer as set forth in claim 9 wherein the reluctance of said toroid to flux generated by said primary feedback winding is smaller in the absence of saturation, saturation of said first or second region providing a virtual air gap, any alternative magnetic paths being of substantially higher reluctance than said unsaturated toroid.

11. A transformer as set forth in claim 10 wherein air gaps are provided at the joints of said double E core to increase the alternative path reluctance.

12. In combination with the transformer set forth in claim 1
   means for supplying current to said power winding and to said primary feedback winding in mutually proportional amounts,
   said primary feedback winding generating a circulating flux around said virtual toroid having a first direction of increase in said third region, the same direction of increase as the main flux in said first region, and an opposite direction of increase as the main flux in said second region, predisposing said first region to saturation prior to the second region when said current increases.

13. The combination as set forth in claim 12 wherein said feedback winding means and said three regions form a virtual current transformer, saturation of said one region reducing the effectiveness thereof.

14. The combination as set forth in claim 13 wherein said primary feedback winding embraces said third region.

15. The combination as set forth in claim 14 wherein with said first region saturated, said main power winding and said secondary feedback winding form a shunted virtual current transformer whose output is in a sense opposite to the sense of said virtual current transformer formed by said feedback winding means, additional main flux increases after saturation reversing the direction of flux change in said third region.

16. The combination set forth in claim 12 having in addition thereto:
A. a switching transistor having a base input electrode and collector and emitter output electrodes, said secondary feedback winding being coupled between said base and emitter electrodes and maintaining a substantially constant voltage drop ($V_{be}$) across said secondary feedback winding when said transistor is conductive, constraining a substantially constant rate of change of flux ($\dot{\phi}_t$) in said secondary feedback winding:

$$\dot{\phi}_t \sim (V_{be}/n_b)$$

where $n_b$ are the turns of said secondary winding,
B. means coupling said primary winding and the output electrodes of said switching transistor in series across said current supply means to provide adequate current to saturate said first region, said arrangement producing a conduction inducing base drive whose initial value is substantially equal to the turns ratio of the primary to secondary feedback winding times the transistor output current, and which decreases as a function of time in proportion to the reluctance associated with said feedback windings, the slope of said decrease being increased when said first region saturates, precluding appreciable incremental flux from flowing in said virtual toroid and forcing it to flow in a high reluctance path.

17. The combination as set forth in claim 16 wherein
A. a second aperture is provided in said core similar to said first aperture but located at the opposite end of said core,
B. a second feedback winding means is provided similar to said first feedback winding means but wound through said second aperture,
C. a second switching transistor is provided similar to said first switching transistor but associated with said second feedback winding means, and
D. said power winding is center tapped, having one winding half serially coupled with the output electrodes of said first switching transistor in series across said current supply means and the second winding half being serially coupled with the output electrodes of said second switching transistor in series across said current supply means.

18. A transformer as set forth in claim 3 wherein said core is has a linear center portion shaped with a length substantially equal to the length of the axis of said power winding.

19. A transformer as set forth in claim 3 wherein said core is "日" shaped, fabricated from two "E" cores.

20. A transformer as set forth in claim 1 wherein said feedback winding means retains a current transformer action in feedback sense reversal in relation to a transistor input junction lead.

* * * * *